United States Patent
Bouzon et al.

(10) Patent No.: US 11,226,614 B2
(45) Date of Patent: *Jan. 18, 2022

(54) USE OF A SMART NODE IN A UNIVERSAL, SMART SYSTEM FOR MONITORING INDUSTRIAL PROCESSES

(71) Applicant: ATOS WORLDGRID, Bezons (FR)

(72) Inventors: Lionel Bouzon, St Pierre d'Allevard (FR); Lionel Debroux, St Etienne de Sainte Geoirs (FR); Charles Eynard, Grenoble (FR); Christophe Voisin, Le Sappey en Chartreuse (FR); Vincent Dimitriou, Champ-sur-Drac (FR)

(73) Assignee: ATOS WORLDGRID, Bezons (FR)

( * ) Notice: Subject to any disclaimer, the term of this patent is extended or adjusted under 35 U.S.C. 154(b) by 689 days.

This patent is subject to a terminal disclaimer.

(21) Appl. No.: 16/081,765

(22) PCT Filed: Mar. 1, 2017

(86) PCT No.: PCT/EP2017/054837
§ 371 (c)(1),
(2) Date: Feb. 6, 2019

(87) PCT Pub. No.: WO2017/149051
PCT Pub. Date: Sep. 8, 2017

(65) Prior Publication Data
US 2021/0116903 A1     Apr. 22, 2021

(30) Foreign Application Priority Data

Mar. 1, 2016   (FR) ...................................... 1651727

(51) Int. Cl.
*G06F 8/65*      (2018.01)
*G05B 23/02*     (2006.01)
(Continued)

(52) U.S. Cl.
CPC ....... *G05B 23/0213* (2013.01); *G05B 19/048* (2013.01); *H04L 67/12* (2013.01); *G05B 2219/14008* (2013.01); *G05B 2223/02* (2018.08)

(58) Field of Classification Search
CPC .............. G05B 23/0213; G05B 19/048; G05B 2223/02; G05B 2219/14008; H04L 67/12; H04L 12/4625; H04L 12/00
See application file for complete search history.

(56) References Cited

U.S. PATENT DOCUMENTS

| | | | |
|---|---|---|---|
| 8,849,325 B2 * | 9/2014 | Schreiber | H04M 1/00 455/500 |
| 2015/0370235 A1 * | 12/2015 | Lloyd | G05B 19/048 700/79 |
| 2019/0155261 A1 * | 5/2019 | Bouzon | G16Y 30/00 |

OTHER PUBLICATIONS

International Search Report dated Apr. 24, 2017 from corresponding application No. PCT/EP2017/054837.
(Continued)

*Primary Examiner* — Kim T Nguyen
(74) *Attorney, Agent, or Firm* — Arc IP Law, PC; Joseph J. Mayo

(57) ABSTRACT

A system for monitoring industrial processes using an evolving set of iso-functional smart nodes, for a distributed mesh network, each node comprising a Linux or Linux-compatible computer hardware architecture and a software stack. Each node receives an execute statement from a program hosted by another node in the mesh and, by execution on the computer hardware architecture of each node, the program is responsible for: two-way communication with other nodes or a central platform (Big Data Management), control of sensors or programmable automatons for monitoring a process or actuators, acquisition and logging of data from the latter, formatting of data and decentralized calculations, the
(Continued)

Figure 1A:
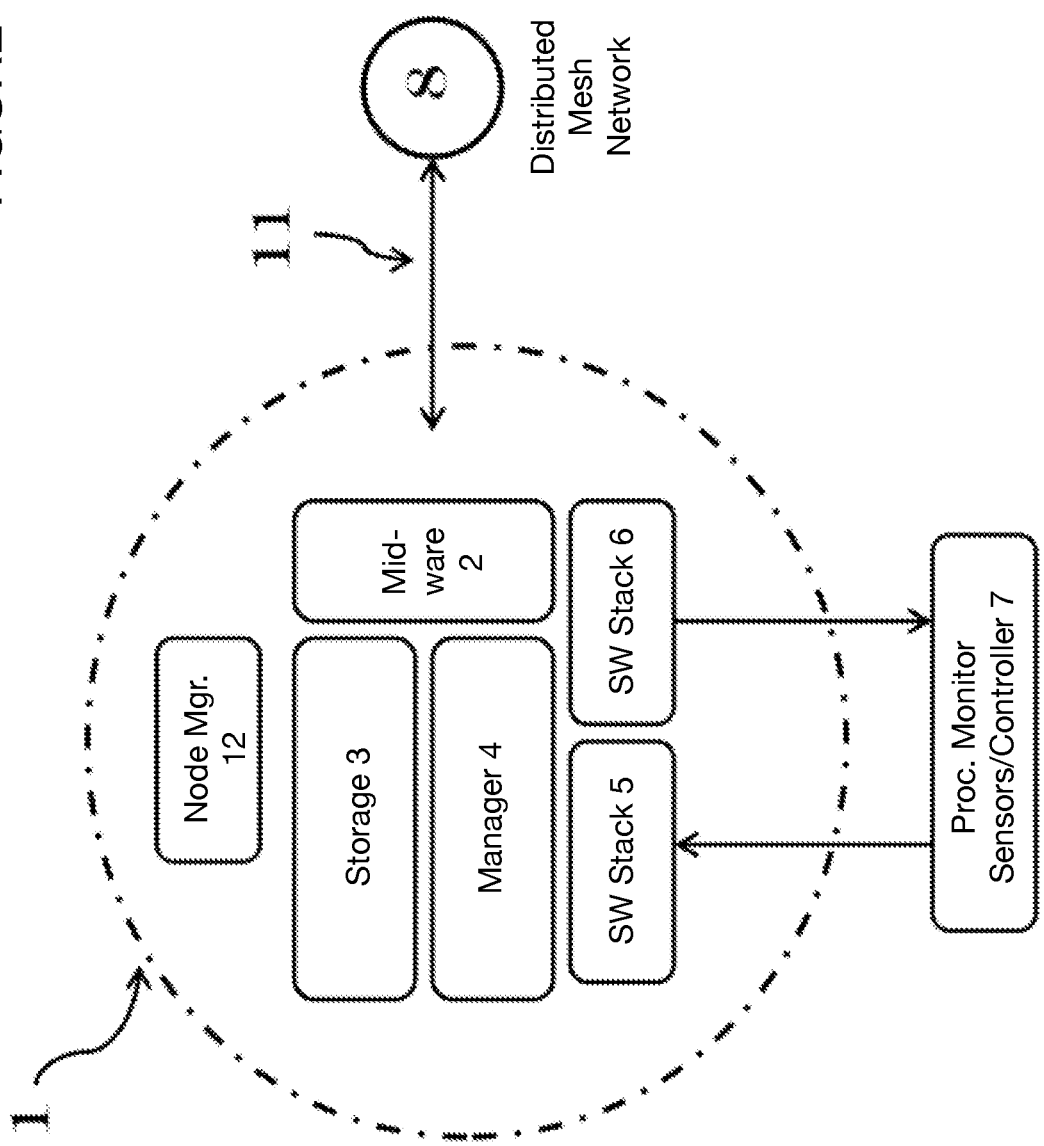

central platform allowing the acquisition, management and storing of a data lake and comprising nodes for synchronous or asynchronous communication with the distributed mesh network.

15 Claims, 4 Drawing Sheets

(51) Int. Cl.
  *G05B 19/048* (2006.01)
  *H04L 29/08* (2006.01)

(56) References Cited

OTHER PUBLICATIONS

Goose S et al., "SKYDA: Cloud-based, secure SCADA-as-a-service", International Transactions on Electrical Energy Systems, vol. 25, No. 11, Nov. 2015, pp. 3004-3016.
Garcia-Dominguez Alejandro, "Enabling SCADA cluster and cloud for smart grid using hierarchical multicast; the PTMF framework", 2015 IEEE International Conference on Industrial Technology (ICIT), IEEE, Mar. 17, 2015, pp. 218-225.
Kyle Wilhoit, "SCADA in the Cloud A Security Conundrum?", Dec. 31, 2013, Retrieved from the Internet URL: http://www.trendimicro.com/cloud-content/us/pdfs/security-intelligence/white-papers/wp-scada-in-the-cloud.pdf.
Loo Dan et al., "Towards Sustainable Water Supply: Schematic Development of Big Data Collection Using Internet of Things (IOT)", Procedia Engineering, vol. 118, 2015, pp. 489-497.
Adrian Glogor et al., "Development of a Service Oriented SCADA System", Procedia Economics and Finance, vol. 3, Jan. 1, 2012, pp. 256-261.

\* cited by examiner

USE OF A SMART NODE IN A UNIVERSAL, SMART SYSTEM FOR MONITORING INDUSTRIAL PROCESSES

TECHNICAL FIELD OF THE INVENTION

The present invention relates to a universal, smart system for monitoring industrial processes using smart nodes.

TECHNOLOGICAL BACKGROUND OF THE INVENTION

An industrial production line generally comprises multiple steps involving various actors or various entities. Each actor produces data, and very often these are managed locally.

For example, in the case of the water treatment process and the valorization of the resources from the treatment, a waste water treatment plant locally controls the industrial processes using practice and running experience local to the site considered (monitoring, control). On the data level, the site (plant) evolves in isolation with, in particular, no interface on the regional (territory) or global (networks and national resources) level. Pooling various sources of information (local, regional, and global sources) is, however, necessary since they would ensure the possibility of comparing, exchanging and valorizing data with the aim of reducing the ecological footprint and operating costs. The benefit of such an approach centers on global optimization of the industrial process and may be both environmental and economic.

Data/information often being (siloed) stored in bulk, it is difficult to have a "catalog" of ready-to-use cases of use/application for business managements.

For the same reasons, it is difficult to have a development environment available on demand, exactly adapted to the application being developed (Hadoop, Spark, DataScience, etc.), and making it possible to reuse parts of applications already developed, for focusing only on the development of the new application.

Finally, the deployment costs are often a "hidden cost", which may become significant in an organization's digital strategy, constrained to deploy more applications in various environments (Cloud, Internal Infrastructure, Container, etc.). These deployments though regular and repetitive are difficult to automate.

The present invention provides a single hardware and software platform, capable of addressing these three issues, for ensuring an industrialization of Big Data applications for the enterprise.

One solution for establishing an interface between the various entities of the industrial process would be to use standard client/server architectures making use of installing virtual private networks (VPN).

However, setting up a VPN would lead to excessive latencies and costs since deployment could involve a multitude of sites and different entities.

Application TW201445929 (A) teaches the use of nodes in a smart mesh network. Nevertheless, the scope for monitoring industrial processes is not conceivable given the lack of possible upgradability.

GENERAL DESCRIPTION OF THE INVENTION

The object of the present invention to overcome some drawbacks of the prior art by providing a system for monitoring industrial processes adapted to a much broader data ecosystem making it possible both to take into account a multi-site dimension and data interfaces at the regional and global levels.

This object is achieved by a system for monitoring industrial processes using an upgradeable set of isofunctional smart nodes, for a distributed mesh network (8), each node comprising a computer hardware architecture and a software stack, said system also including process monitoring sensors or process monitoring programmable controllers or actuators for data acquisition, the data from the latter being injected into a data lake via the mesh network, a central platform for mass data management (Big Data Management) allowing the management and the storage of the lake, said system for monitoring industrial processes being characterized in that each node receives an execution order from a program hosted by another node of the mesh, said program associating, with the communication module of each node, an identifier specific to the node and a neighborhood identifier for implementing by execution on the hardware architecture of each node, a set of functionalities comprising at least one of the following functionalities of the software stack:

diffusion, in the form of time series, of the data collected or calculated by the smart nodes by combining two data diffusion modes: a "systematic" data diffusion mode wherein the data are diffused with a given resolution or criterion and to a given depth in the mesh (e.g. 3 or 4 levels of neighborhoods), and an "opportunistic" diffusion mode wherein at least one neighboring node of another node concerned by an initial data request, autonomously records the information or the data passing therethrough in its memory in order to rebroadcast said data or information when a similar request to the initial request is repeated;

storing, in addition to information from the sensors or actuators or programmable controllers of the processes, a field or attribute indicating that the node concerned is a parent of the object, referred to as the "parent node";

connecting said platform to any node of the mesh, by sending the identifier of the node to be modified, said node being remotely and dynamically modified even if a user is connected to a node that is not the parent node of the object that they wish to modify.

According to another feature, the set of functionalities includes data logging and formatting decentralized calculations.

According to another feature, the data lake comprises synchronous or asynchronous means of communication with the distributed mesh network formed of smart nodes for allowing the injection of data into the lake.

According to another feature, the platform managing the data lake is composed of three parts or "layers", each including at least one computer hardware architecture, and at least one software layer, the execution of each of the software layers on each computer hardware architecture implementing, in each part or layer of the platform, a functionality for managing problems, the problems addressed being, on the one hand, different from one platform layer to another and, on the other hand, associated with different people needing to interact with the Big Data in an enterprise: the business users, the developers, and the administrators/DevOps (moderators between the developers and the business users).

According to another feature, the platform generates a representation in the data lake of the constitution and status of the network and of the processes connected to the network and updates said representation at each change.

According to another feature, the data lake for measurement and process control is composed of a set of tools for storing and processing or recording data from the industrial process.

According to another feature, the set of functionalities comprises the functionalities, implemented on a computer hardware architecture of the central platform, for creating and managing objects adapted to industrial processes for controlling said processes.

According to another feature, each object belongs to at least one class which is a description of the characteristics of one or more objects representative of an industrial process, each object being created from this class and forming an instance of the class in question, the characteristics and the status of an object being handled by methods incorporated in the smart node or the platform, the status of an object corresponding to the information stored at a given instant, as described by the values of the set of its properties, also referred to as fields or attributes.

According to another feature, an object is a representation of business or technical data defining a variable and/or a service, the variables and/or services including:
- technical services consisting of protocol service layers for communicating with industrial equipment;
- "primary" variables which are variables storing data gathered by the technical services;
- calculation services which are for calculating indicators and implementing the logic based on the values of the primary variables;
- secondary variables which are for storing the results of the values from the calculation services. They are therefore variables derived (by calculation) from the primary variables;
- miscellaneous services referred to as "general" services (e.g. archiving, printing, taking photos or videos, specific algorithm) for supplementing a system of control and data acquisition (SCADA) by business or media services.

According to another feature, each smart node comprises middleware allowing the deployment of multiple nodes in a distributed mesh by critical mass and neighborhood effect consisting in optimizing, by means of an algorithm executed on the hardware architecture, the number of smart nodes to be deployed and the number of their interconnections via neighborhoods for achieving the availability, robustness of deployment and continuity of service required by the quality of service of a specific service.

According to another feature, each node comprises means for storing and managing at least one object, for maintaining the current status of the object and using a stored list of neighborhoods of the nodes to which it itself is connected for informing each neighboring node of the possible change of status of the object.

According to another feature, the set of functionalities comprises a functionality, implemented on a computer hardware architecture of each node, for informing each node in its neighborhood so that the neighboring nodes inform the other nodes following a path oriented in a direction that depends on the topology or specific architecture of the mesh, defining the links between the nodes of the network, or if necessary following a path oriented toward the central platform, each node thus informing the rest of the network and the mesh and each node thus storing the object, its current status and the parent node to which the object is assigned.

According to another feature, the nodes have a given, finite memory capacity, each node being used for the transfer of information or data directly to the data lake or the neighboring nodes, the information or data not being retained in their cache memory.

According to another feature, each node has at least one interface for accessing its image of the "object dictionary", this interface allowing the definition of a new node or a new object for a node, the request for modification being diffused in the mesh and transmitted from one node to another up to the parent node concerned if the modification made to the dictionary does not relate to the node from which the manager is accessed, the parent node of the object then proceeding to the execution of the request, the result of the execution then being diffused in its turn in the rest of the mesh, each node receiving this result updating its own image of the "object dictionary".

According to another feature, the objects are handled without the modifications made to the status of an object do not use the status of another object or influence this one, each object having a possible access permission for any use or any entity of the industrial process, the attributes or definition fields of the objects and the methods of handling the objects being changed dynamically by the node manager.

According to another feature, each object uses an attribute that defines a quality parameter representing the difference between a desired target value of the status of the object and the actual status (actual state) of the value, the desired status of an object being formalized by the request for modification of the status of said object, said request being able to be formulated from any remote node even if it is not the parent node of the object, then transmitted to the mesh and from one node to another up to the parent node concerned, the execution of said request by the node concerned thus allowing each of the nodes of the mesh to retrieve the actual status of an object and therefore to calculate its quality.

DESCRIPTION OF THE ILLUSTRATIVE FIGURES

Figure 1B:
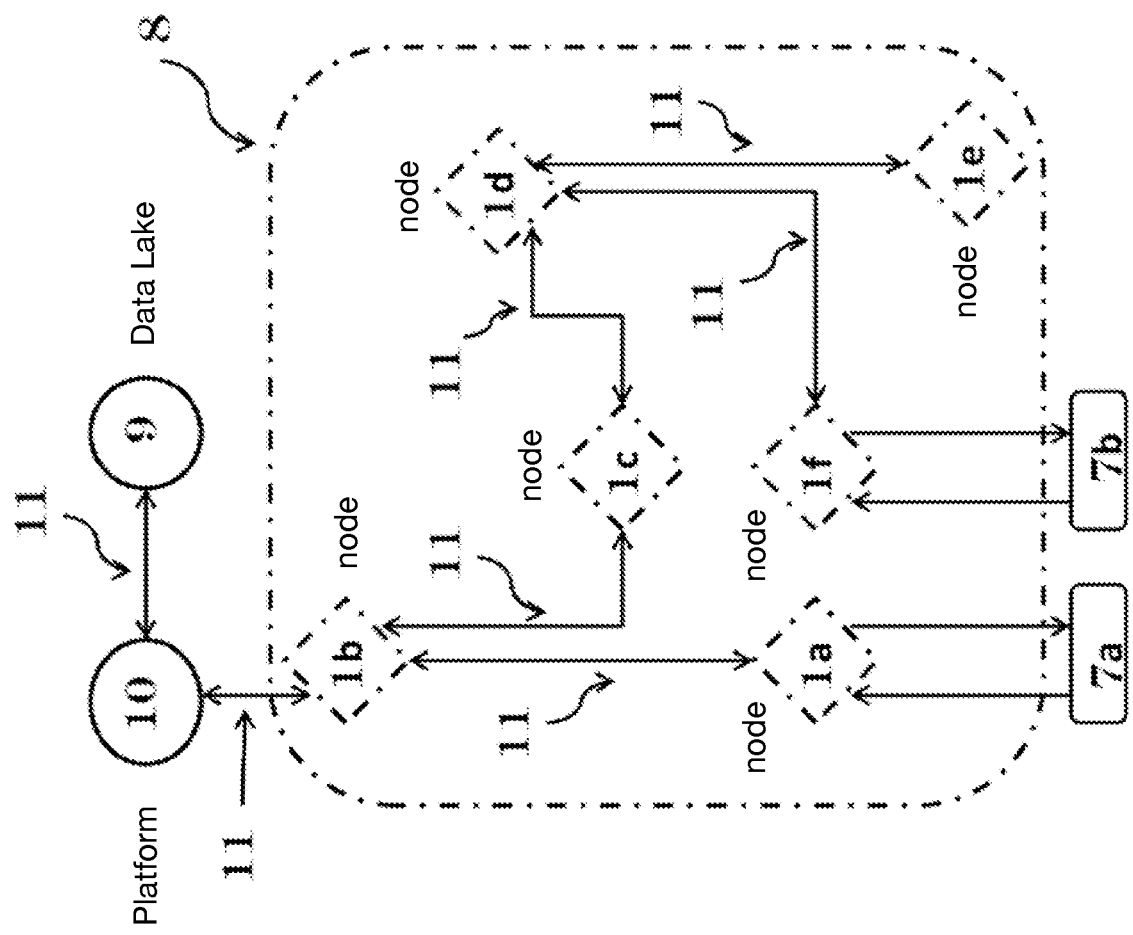
Figure 2:
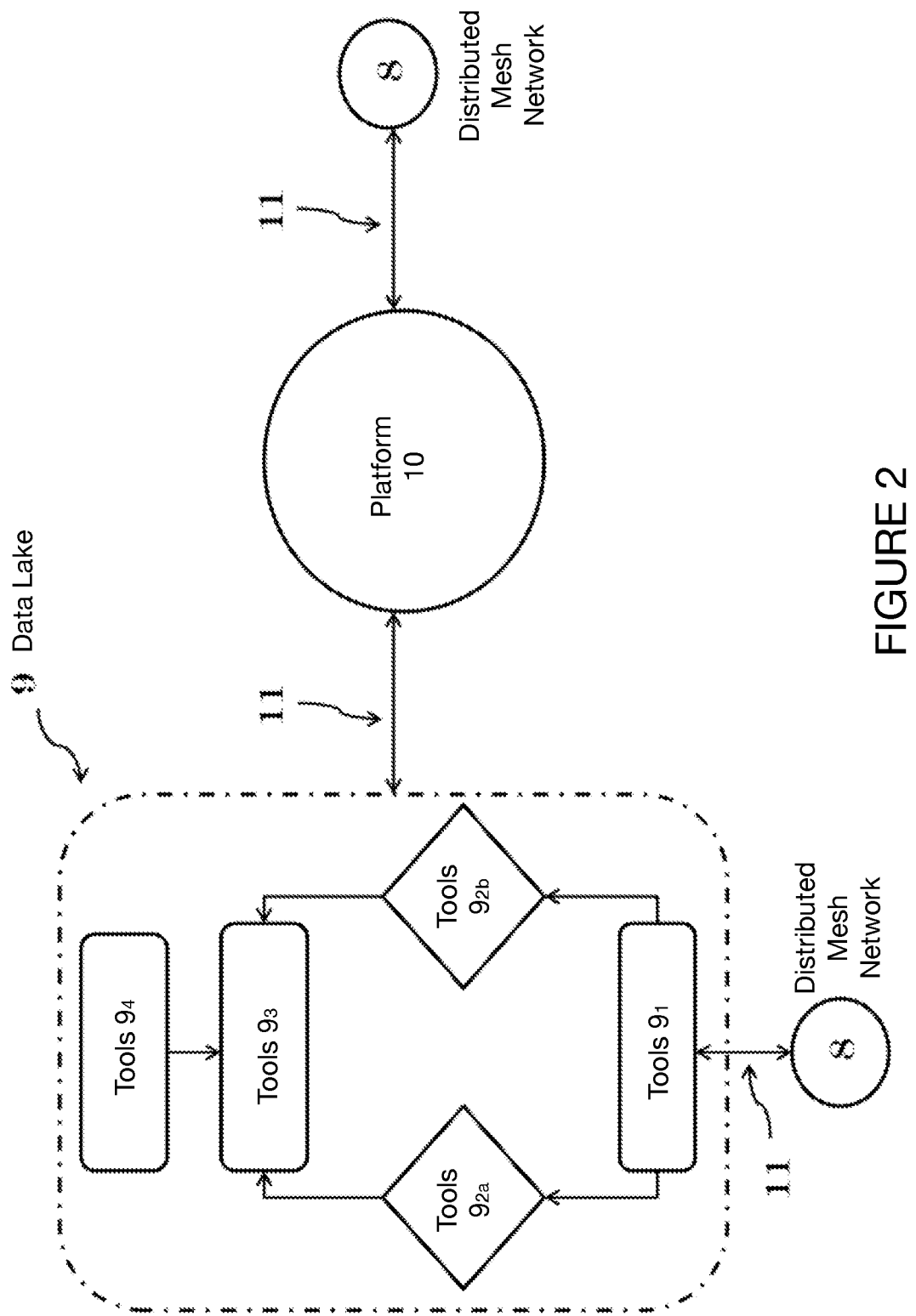
Figure 3:
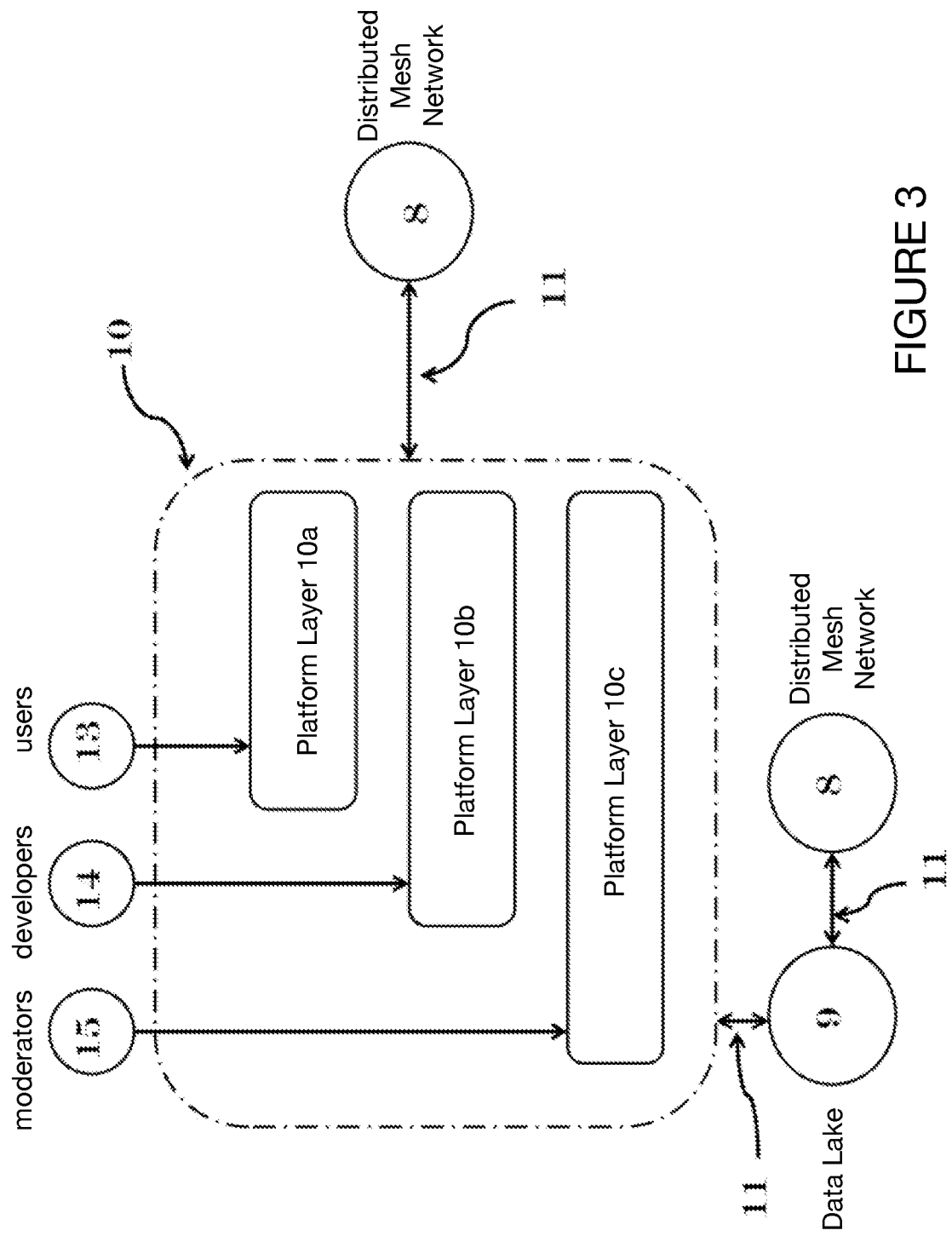

Other features and advantages of the present invention will appear more clearly on reading the following description, made with reference to the appended drawings, in which:

FIG. 1A represents a diagram of the architecture of the smart node according to a first embodiment, FIG. 1B represents an operating diagram of the smart node according to a second embodiment, FIG. 2 represents an operating diagram of the smart node according to a third embodiment, FIG. 3 represents a diagram of the use of smart nodes in a universal, smart system for monitoring industrial processes according to one embodiment.

DESCRIPTION OF PREFERRED EMBODIMENTS OF THE INVENTION

The present invention uses at least one Smart Node (1, FIG. 1A) for constituting with other nodes a distributed mesh network (8) as represented in FIG. 1B.

In some embodiments, the smart node (1) comprises a computer hardware architecture and a small footprint (10 to 300 Mbytes) software stack (2, 3, 4, 5, 6), with low resource consumption running on the hardware architecture. Said architecture being hardened (not represented), of an X86 type or ARM Raspberry or MIPS type, energy-efficient and resistant to severe environmental conditions (shocks and vibration, temperature from −40° C. to +80° C.) running under a LINUX operating system or similar.

A smart node will conform to a microservices type of architecture. It comprises a backbone around which the Node Manager (12) is built. Said node manager is programmed for dynamically activating, on demand, a range or set of functionalities among the following categories:

acquisition and instrumentation capabilities (e.g. in Modbus, or Physical Signals), data and message logging, formatting and decentralized calculations on the data, web dashboards for operators on the move, gateway and Machine-To-Machine (M2M) interoperability.

In some embodiments, each smart node (e.g. 1a, FIG. 1B) for a distributed network comprises a piece of middleware (2) incorporating a communication agent for two-way communications (11) with other nodes (1b, 1 c, 1d) to a central platform (10) and by the neighboring node (1d) to each neighboring node (1e) or (1f) according to need. This middleware (2) thus allows the deployment of multiple nodes in a distributed mesh network (8) by critical mass and neighborhood effect consisting in optimizing, by means of an algorithm executed on the hardware architecture, the number of smart nodes to be deployed and the number of their interconnections via neighborhoods to achieve the availability, robustness of deployment and continuity of service required by the quality of service of a specific service.

This mesh is typically referred to as a smart node network [Smart Node Mesh] (SNM).

Deployment typically takes place in the following way: the software of each node (1) is factory configured with a minimum range of functionalities allowing it to boot up and communicate in its immediate neighborhood. These basic functions allow a gradual first diffusion of the characteristics of a node, namely its identifier and the objects already configured.

Each node (1a, . . . , 1f) thus comprises a device including at least one software layer, for storing (3) and managing (4) at least one configured object, maintaining the status of the object at each instant referred to as the "current status" and implementing at least one method of monitoring the change in the status of the object. This method uses a stored list of neighborhood identifiers of the nodes (e.g. 1c, 1e, 1f) to which the node (e.g. 1d) is itself connected, for informing each neighboring node of the possible change of status of the object, by the use of this list of neighborhoods.

An object is a representation of business or technical data defining a variable and/or a service, the variables and/or services including:

technical services consisting of protocol service layers for communicating with industrial equipment (e.g. Modbus, OPCUA, CanOPen, CAN application layer);

"primary" variables which are variables storing data gathered by the technical services;

calculation services which are for calculating indicators and implementing the logic based on the values of the primary variables;

secondary variables which are for storing the results of the values from the calculation services. They are therefore variables derived (by calculation) from the primary variables;

miscellaneous services referred to as "general" services (e.g. archiving, printing, taking photos or videos, specific algorithm) for supplementing a system of control and data acquisition (SCADA) by business or media services. For example, if a vibration indicator (secondary variable) exceeds a certain threshold then 10 photos are taken in a burst by a general service and these photos are transmitted to the rest of the mesh.

In some embodiments, said smart node, for example, (1a or 1f) comprises a device including at least one software layer (5, 4, 3), making it possible to store, thanks to a logging software layer (3), in addition to the information from the sensors of the process (7a or respectively 7b) and filling out the fields of an object assigned to this node, an attribute representative of the identifier of said node (1a or respectively 1f) and indicating that the node concerned is a parent of the object, said node being referred to as the "parent node".

In some embodiments, the software stack (5, 6) of said node makes it possible as a result of processing performed by a processing engine (4) to send, via the software layer (6), control signals to the sensors or programmable controllers or actuators for monitoring a process (7a or 7b) connected to the node (1a respectively 1f) and via another software layer (5), the acquisition of the data from the sensors or actuators or programmable controllers of the processes (7a, 7b). Conversely the processes (7a, 7b) will be able to feed back the information via their respective neighborhood node (1a, 1f) in the neighborhood to the platform (10) then the data lake (9).

In some embodiments, the nodes (1) may be used in a universal, smart system for monitoring an industrial process comprising a central platform (10) for mass data management (Big Data Management) for the acquisition, management and storage of a data lake (9, FIG. 2) and means of communication (11) with a distributed mesh network (8) consisting of smart nodes (1a to 1f). The structuring of the monitoring logic in what is called an object dictionary makes it possible to define, using "atomic parts" (mainly services and object variables), what is generally defined as a monolithic application in the prior art of industrial monitoring systems. The set of services form what is called "monitoring intelligence". The latter is made "transportable" thanks to the middleware (2), capable of distributing both data and "intelligence" on different nodes (1) of the network (8) thereby forming the monitoring network. The embedded engines of local services are capable of managing services of different types (not only calculations) homogeneously and irrespective of the hardware platform. The main advantage of the engines responsible for the services lies in the fact that they can run on small hardware units (low in CPU [Central Processing Unit] and memory resources).

In some embodiments, the set of functionalities comprises a functionality, implemented on a computer hardware architecture of each node (1) (e.g. 1f), for informing each node (1) in its neighborhood (e.g. 1d) so that the neighboring nodes (1) inform the other nodes (1) following a path oriented in a direction that depends on the topology or specific architecture of the mesh, defining the links between the nodes of the network, or if necessary following a path oriented toward the central platform (10), each node (1) thus informing the rest of the network (8) and the mesh and each node (1) thus storing the object, its current status and the parent node to which the object is assigned.

The set of objects is gathered together in an object dictionary shared and known to each node of the mesh. The implementation of this dictionary, which is based on the use of an in-memory NoSQL database, is innovative since it is very compact and independent of a predetermined object model. This compactness of the dictionary thus allows diffusion throughout the mesh (8).

Once a node (1) is first placed in service, it then becomes visible and/or accessible from any other node (1) of the mesh (8). A local graphical interface incorporated in each node then makes it possible to work on the most easily accessible node while allowing the configuration and modification of the services and functionalities of a remote smart node. The most common modifications are:

adding additional objects, modifying the diffusion policy of the data, activating and/or installing an additional software module (e.g. the ability of the smart node to become a web server, the ability to interoperate with a new system, etc.). An additional functionality is first implemented in the form of a module recognized by the node manager. Said node manager (12) thus manages the dynamic deployment of new functionalities and functionalities implemented by the software modules, executed on the computer hardware architecture, by monitoring and controlling the rebooting and security updates of a software module that has been interrupted or died. A given node (1) [Smart Node] is therefore configured for operating with a certain range of software modules under the monitoring and control of the node manager.

One of the very innovative factors of the invention is that it is not absolutely necessary that the node (1) [Smart Node] on which a user is working is the one that he wishes to modify or is on the same network or in "direct IP visibility" as a client would be with a conventional server. Indeed, communication in the mesh relies on gradual communication. For example, and non-restrictively, a modification is made locally on a node A to a node E. Node A shares the same neighborhood ($V_{A,B}$) as node B which has the neighborhood ($V_{B,A}$; $V_{B,C}$; $V_{B,D}$). Node B shares the same neighborhood as nodes C and D. Node D shares the same neighborhood as node E. Node B is informed of the modification made to node A for the attention of E. As this does not concern it, it merely informs its neighborhood of this, i.e. B, B then informs C and D, etc. Thus, gradually the modification request arrives in the neighborhood concerned and at the node concerned (E). Node E proceeds to perform the modification and if it succeeds, it informs its neighborhood that its configuration has changed. The notification of the success of the modification is thus propagated back to the rest of the mesh.

In some embodiments, the diffusion of the data collected or calculated by the smart nodes (1) (diffusion in the form of time series) is performed by combining two data diffusion modes: a "systematic" diffusion mode wherein the data are diffused with a given resolution and to a given depth in the mesh, and an "opportunistic" diffusion mode wherein at least one neighboring node (1) of another node (1) concerned by an initial data request, autonomously records the information or the data passing therethrough in its memory in order to rebroadcast said data or information when a similar request to the initial request is repeated, the pattern or scheme of diffusion of data diffused by the nodes (1) being different from a systematic replication scheme wherein the data diffusion scheme is identically duplicated for all the nodes.

Systematic diffusion takes place by configuration of the diffusion module of the node (1), this diffusion module being initially configured for diffusing a variable or a given group of variables with a certain resolution and to a certain "depth in the mesh", e.g. 3 or 4 levels of neighborhoods. This systematic policy thus allows, at any point of the mesh, having a certain level of hypervision (not optimal with the best granularity and resolution, but all the same an overall view).

Opportunistic diffusion is the ability of the mesh to respond dynamically to a question. For example, it may involve finely tracking, to the second between 2:03 pm and 2:08 pm from node A, the value of a pressure P1 acquired by node E at intervals of half a second, but diffused systematically only at an interval of 20 minutes to the third and fourth level neighborhoods to which A belongs. In this case, locally at node A, the data is not available, so this node will form a specific request to try to retrieve the requested values. The request will pass gradually, from neighborhood to neighborhood until finding a node that is able to return a time series meeting the criterion. If the question is put for the very first time, the response will certainly be given by node E. By diffusing the response, the "opportunistic" policy consists for the other nodes of the mesh (8) in recording in their cache memory (in the proxy-cache sense) this fraction of time series with a very precise resolution between 2:03 p.m. 2:08 p.m. The next time that the same question is asked again in the mesh (8) (this being very likely since it is certainly an epiphenomenon that may interest other users from other nodes) it will obtain a faster response since the response will already be pre-stored by a neighboring node.

In-plant configuration capability, in particular in changing the configuration of the nodes (1) along the way, allows the network (8) of nodes to be expanded in order to adapt to any situation and deal with any industrial process.

In some embodiments, the nodes are isofunctional, each node receiving an execution order from a program hosted by another node of the mesh, the execution orders being either identical, or different from one node to another. Said program also associates with the communication module of each node an identifier specific to the node and a neighborhood identifier. The communication module having its node identifier and the neighborhood identifier, transmits messages or requests to all the connections that it has had via wired or wireless means, the transmitting node recording in its cache memory the neighborhood identifiers of the nodes with which it may communicate. For example, and non-restrictively, if the request concerns the results of a measurement, it is sent to all the nodes of the neighborhood. If among the nodes of the neighborhood there is at least one in the immediate neighborhood of the transmitting node that has the results in memory, these are transferred to the node concerned. If the nodes of the neighborhood are not able to respond to the request, the request is transferred to the nodes of their respective neighborhood until the node that performed the measurements responds to it. The results are transmitted from neighborhood to neighborhood up to the node transmitting the request.

In some embodiments, the nodes (1) have a given, finite memory capacity, each node (1) being used for the transfer of information or data directly to the data lake or the neighboring nodes, the information or data not being retained in their cache memory.

In some embodiments, the platform (10) generates a representation in the lake (9) of the constitution and status of the network and of the processes connected to the network and updates said representation at each change.

In some embodiments, said data lake (9) for measurement and process control is composed of a set of tools ($9_1$, $9_{2a}$, $9_{2b}$, $9_3$, $9_4$) for storing and processing or recording data from the industrial process. A synchronous ($9_{2b}$) or asynchronous ($9_{2a}$) two-way (11) communication means communicates either on the one hand directly with the nodes of the network (8) or on the other hand through the platform (10) with the nodes of the network (8) to allow, inter alia, injecting data into said lake (9), but also changes in the objects and thus in the control instructions.

In some embodiments, the set of functionalities comprises the functionalities, implemented on a computer hardware architecture of the central platform (10), of creating and managing objects adapted to industrial processes for controlling said processes (monitoring a power transmission and distribution complex, monitoring a set of plants, monitoring a set of oil platforms, monitoring a water treatment and distribution complex, etc.).

In some embodiments, each object belongs to at least one class which is a description of the characteristics of one or more objects representative of an industrial process, each object being created from this class and forming an instance of the class in question, the characteristics and the status of an object being handled by methods incorporated in the smart node (1) or the platform (10), the status of an object corresponding to the information stored at a given instant, as described by the values of the set of its properties, also referred to as fields or attributes.

In some embodiments, each node (1) has at least one interface for accessing its image of the "object dictionary", this interface allowing the definition of a new node or a new object for a node, the request for modification being diffused in the mesh and transmitted from one node to another up to the parent node concerned if the modification made to the dictionary does not relate to the node from which the manager (12) is accessed, the parent node of the object then proceeding to the execution of the request, the result of the execution then being diffused in its turn in the rest of the mesh, each node (1) receiving this result updating its own image of the "object dictionary". This new architectural paradigm allows an actual distribution of the monitoring logic ensured collectively by the mesh by eliminating the use of a single central node.

In some embodiments, the objects may be handled without the modifications made to the status of an object do not use the status of another object or influence this one, each object having a possible access permission for any use or any entity of the industrial process, the attributes or definition fields of the objects and the methods of handling the objects being changed dynamically by the node manager (12).

In some embodiments, each object uses an attribute that defines a quality parameter representing the difference between a desired target value of the status of the object and the actual status (actual state) of the value, the desired status of an object being formalized by the request for modification of the status of said object, said request being able to be formulated from any remote node even if it is not the parent node of the object, then transmitted to the mesh and from one node to another up to the parent node concerned, the execution of the request by the node concerned thus allowing each of the nodes of the mesh to retrieve the actual status of an object and therefore to calculate its quality.

The smart node mesh (SNM) network makes it possible to deploy an industrial monitoring infrastructure, for simulating or collecting and analyzing data particularly adapted to physically very spread out processes (small power plants, IoT, distribution, wind or wave farms, open field sensors, process simulation).

The smart node mesh network is an innovative software solution in the field of industrial monitoring. Its aim is to complement the SCADA systems on the market for allowing a quick and agile deployment of permanent or temporary monitoring schemes.

Unlike conventional SCADA systems based on central and very vertical server type systems, the smart node mesh network makes it possible to define a monitoring strategy carried by a set of software nodes connected via smart middleware. It is therefore possible to define a monitoring logic best fitting the process and with a very fine granularity. This granularity makes it possible inter alia to be able to define individual permissions on each of the monitoring elements (variables, algorithms) making the smart node mesh network a multiuser but especially a multi-entity system. The atomic manipulation of the monitoring elements also allows hot deployment and scaling of monitoring while limiting the risks of regression on the existing logic.

The software nodes can run on a wide range of hardware, notably including mobile devices (smartphones and tablets) but also embedded industrial field equipment. The smart node mesh network therefore natively introduces mobility while providing each user, regardless of their point of connection, with the same quality of overall hypervision as a central system.

Finally, the smart node mesh network provides a wide range of remote deployment functionalities on the most constraining network topologies (complex routing, reduced bandwidth) and without needing to use VPN. These innovations allow a temporal decorrelation and that of the role of maintenance and scaling actions notably by eliminating the need for computer skills, PLC (Programmable Logic Controller or programmable controller) or SCADA in the field. Accordingly, the smart node mesh network thus provides a Plug and Play solution where the operationals are limited to connecting the field devices to the electrical network and the communication network. The rest of the deployment (software and monitoring logic blocks) is then provided by remote users.

The smart node mesh network is therefore particularly adapted to physically spread out industrial processes and where the costs of maintenance and scaling are an important factor.

Nevertheless, in a context of plant monitoring, the smart node mesh network also offers many advantages.

As part of renovating or upgrading existing industrial monitoring systems, the addition of software nodes to the smart node mesh network makes it possible to quickly implement advanced mobility functions throughout the plant area. The mesh construction of the solution further allows a progressive deployment open to modifications in strategy according to the initial feedback from users.

Many functionalities may also be used as part of smart maintenance or predictive maintenance. Additional instrumentation (sensors, hub) and analysis (tracking, logs, alarms, dashboards) may be created on the fly and in active collaboration between multiple users for the purposes of optimizing the process or setting up asset tracking (electronic documentation, QR Codes).

The smart node mesh network seen as a dynamic tool also allows the deployment of monitoring and temporary analysis strategies very much adapted to the auditing phases (energy efficiency, simulation, security and industrial safety). For this type of deployment in particular, the smart node mesh network is compatible with a wide range of wireless communication in the ISM band [Industrial Scientific and Medical band] (169 MHz, 868 MHz, 969 MHz) and notably with SIGFOX* (Ultra Narrow Band) and LoRA* technology.

In some embodiments, the central platform comprises a device including at least one software layer, said software layer implementing, by execution on a computer hardware architecture, a functionality of connecting to any node of (1)

the mesh (8), by sending the identifier of the node to be modified, so as to remotely and dynamically modify the node (1) concerned even if the user is connected to a node (1) that is not the parent node of the object he wishes to modify.

Thus, for example, and without limitation, as part of the overall monitoring of an industrial wastewater treatment process, the solution developed is capable of acquiring data from treatment methods internal to the plant or upstream and downstream thereof in the natural environment.

On the other hand, it is also capable of integrating other data in connection with the data ecosystem and relevant to its smart and end-to-end running. These are referred to as external sources in the rest of this document (e.g. weather forecasting, trading, energy markets).

The data sources are therefore of a very varied nature. Notably there will be a need for knowing how to interface with specialized sensors in open field (SigFox or LoRA wireless link, for example), for compatibility with a range of instrumentation or industrial interoperability protocols (e.g. Modbus*, OPC*, OPCUA*), compatibility with interoperability standards for objects or people on the move (ETSI M2M*) and finally the possibility of interrogating third-party systems in the cloud (e.g. analysis and exploitation of Web content, REST [Representational State Transfer] API, hydrological databases, e.g. flood management in the case of a water treatment plant).

Thus, the software layer (6) for sending control signals and the software layer (5) for data acquisition, to or from the sensors or actuators or programmable controllers of processes, must cooperate with hardware allowing wireless links in addition to wired links and be compatible with a range of instrumentation or interoperability protocols for moving objects or people.

The mesh deployment of the network (8) makes it possible to create an interface with the data ecosystem at various levels of aggregation (field, vehicles, plants, regional area, global or cloud level). An architecture of this type therefore makes it possible to collect the data at the most suitable levels. The transmission of the data may therefore involve multiple nodes prior to the Big Data Management (BDM) central platform (10) being made available for valorization.

After valorization and creation, e.g. of relevant indicators constituting the field of an object, for running the process, inter-node communication may be used again, but "in the downward direction" this time for transmitting optimized instructions down to the field. Here again the mesh architecture makes it possible to do away with direct communication links between the global level and the field.

The implementation of the functional layers of this global information system thus takes place with different levels of aggregation, it therefore involves not only a conventional central system but an infrastructure capable of addressing a highly distributed (sensors in a natural environment, moving vehicles or people, plants at different sites, interoperability with third-party regional systems or central systems) and highly dynamic problem (deployment of new services, scaling, adaptability to the availability or non-availability of parameters necessary for the hypervision or the optimization of running processes).

According to the invention, the data from the acquisition phase are stored in a data lake (9) consisting of a set of tools for the storage itself and the processing or enrichment of the data.

In some embodiments, the platform (10) managing the data lake (9), is composed of three parts or "layers" (10a, 10b, 10c), each including at least one computer hardware architecture and at least one software layer, the execution of each of the software layers on each computer hardware architecture implementing, in each part or layer (10a, 10b, 10c) of the platform (10), a functionality for managing problems, the problems addressed being, on the one hand, different from one platform layer to another and, on the other hand, associated with different people needing to interact with the Big Data in an enterprise: the business users (13), the developers (14), and the administrators/DevOps (moderators between the developers and the business users) (15).

These layers make it possible to implement, using the tools below, the life cycle processes of the data in order to manage the data lake (9) and exploit the data according to the technical or business constraints.

The control and quality of the data stored from end to end is a major issue, as well as the mastery and control of the processing that is put in place through an architecture, known as "Lambda Architecture", synchronous and asynchronous processes, driven by proven basic components. These checking, control and correction procedures are performed throughout the data processing chain.

API (Application Programming Interface) Services will manage the interface with the system components and the administration console.

The data collected by the nodes (1) [Smart Nodes] are injected into the storage system through a synchronous ($92b$) [Speed Layer or real time processing] or asynchronous ($92a$) [Batch Layer or batch processing] process in the NoSQL* database (Server Layer). The NoSQL* base chosen is the MAPR Hadoop* distribution offering all the security and industrialization guarantees that a production database must have. It is indeed the only Hadoop* distribution natively offering replication management functionalities on a remote site.

Kafka* software ($9_1$) will be used for the data injection function and interfaced with the nodes (1) (Smart Nodes) and the other internal or external data sources, connectors for some of which are available (social and other networks). Kafka* ($9_1$) also has the considerable advantage of being horizontally scalable, making it suitable for the volume of information to be processed.

With regard to batch processing, using Flume* software allows the link between the injection module and the processing modules, thus having a distributed system to these analysis modules. The Spark* and "R*" software programs run "Machine Learning" algorithms and complex algorithms respectively on the data.

Spark software (with Spark-streaming) is made use of for real time processing which makes it possible not only to apply "Machine Learning" algorithms but also a large number of models that are available today.

Finally the Server Layer ($9_3$) is composed of the MAPR NoSQL base* (Hadoop distribution) and the data indexing module ElasticSearch*.

The whole solution is orchestrated by the Hadoop Self Service* (HSS) software package for creating the complete Hadoop platform on demand. This software service offers the possibilities of:
creating and managing the lifecycle of its cluster,
importing and exporting data,
automating the deployment of the tools common to the Hadoop ecosystem, as well as any other tools,
offering the opportunity to project teams of creating their cluster on demand through application templates,
defining rules and conditions to be respected during deployment (e.g. minimum amount of RAM for a Hadoop instance), defining life cycle roles: configuration of the cluster, deployment on demand, monitoring.

The Hadoop Self-Service* approach makes it possible to create application topologies that can be deployed in one click which will meet the needs of industrialization and a new need for a simple and fast method. In addition, this approach will make it possible to deploy, in addition to the Hadoop* clusters, other tools necessary to projects that do not form part of the Hadoop distribution used and which cannot be deployed through tools like Ambari* or Cloudera Manager*. Finally, the Self-Service approach may include and provide multiple other services such as high availability and security. The Hadoop Self-Service approach is possible thanks to the Alien4Cloud* tool (developed by the R&D teams of the ATOS group).

The rendering of valorized data or "Data visualization", which takes place at a central level, is carried out via two modules:
- a simple rendering via the Kibana* portal ($9_4$), directly linked to ElasticSearch*. This portal offers static and dynamic graphical renderings (integration of D3JS) of the instantiated indicators and data.
- a more advanced rendering, for example, with the DATAIKU "Data Science Studio" (DSS) software, in order to take advantage of more advanced "Machine Learning" algorithms and available statistical algorithms for predicting faults and system failures. The DSS module makes it possible to create a single point of view for the disparate data sources (NoSQL, SQL, Hadoop), with interactive data preparation.

The solution that is provided for the BDM block mostly consists of already integrated software or for which the connectors between these blocks exist. For those that have to be developed, the software is open enough to create these connectors, notably that between ZeroMQ* and Kafka*.

The invention provides an information system communicating in a two-way manner and notably allowing collection and multisite hypervision as well as the ability to feed back down to a given site optimized running instructions from a global analysis of the data through a "Big Data" block.

At the global level the system will include the long-term logging of plant process data (all the sites) coupled with data from "external" global sources (weather forecasting, markets).

The concept of Intelligence mainly covers the ability to ingest the data from this vast ecosystem, for valorizing it on the basis of its logging and analysis or learning (Machine Learning) algorithms then rendering this valorization in various forms just as an "experienced and knowledgeable professional co-driver" would.

The present application describes various technical features and advantages with reference to the figures and/or to various embodiments. The person skilled in the art will understand that the technical features of a given embodiment may, in fact, be combined with features of another embodiment unless it is explicitly mentioned otherwise or it is obvious that these features are incompatible or that the combination does not provide a solution to at least one of the technical problems mentioned in the present application. In addition, the technical features described in a given embodiment may be isolated from the other features thereof unless explicitly mentioned otherwise.

It should be obvious to persons skilled in the art that the present invention allows embodiments in many other specific forms without departing from the scope of the invention as claimed. Consequently, the present embodiments must be considered by way of illustration, but may be modified in the field defined by the scope of the attached claims, and the invention should not be limited to the details given above.

The words or acronyms XXX represented as XXX* in the description above, are registered trademarks.

What is claimed is:

1. A system for monitoring industrial processes using an upgradeable set of isofunctional smart nodes, for a distributed mesh network, each node of said upgradeable set of isofunctional smart nodes comprising a computer hardware architecture and a software stack, said system comprising:
   process monitoring sensors or process monitoring programmable controllers for monitoring a process or actuators for data acquisition of data, the data being injected into a data lake via the distributed mesh network,
   a central platform for mass data management allowing management and storage of the data lake,
   wherein said each node receives an execution order from a program hosted by another node of said upgradeable set of isofunctional smart nodes of the distributed mesh network, said program associating, with a communication module of said each node, an identifier specific to the node and a neighborhood identifier for implementing by execution on the computer hardware architecture of said each node, a set of functionalities comprising at least one functionality of functionalities of the software stack comprising:
   diffusion, in a form of time series, of the data collected or calculated by the upgradeable set of isofunctional smart nodes by combining two data diffusion modes: a systematic data diffusion mode wherein the data are diffused with a given resolution or criterion and to a given depth in the distributed mesh network, and an opportunistic diffusion mode wherein at least one neighboring node of said another node of said upgradeable set of isofunctional smart nodes concerned by an initial data request, autonomously records information or the data passing therethrough in a memory in order to rebroadcast said data passing therethrough or the information when a similar request to the initial data request is repeated;
   storing, in addition to the data from the process monitoring sensors or actuators or process monitoring programmable controllers of the industrial processes, a field or attribute indicating that the at least one neighboring node that is concerned is a parent of an object, referred to as a parent node;
   connecting said central platform to any isofunctional smart node of the distributed mesh network, by sending the identifier of the node to be modified, said node being remotely and dynamically modified even if a user is connected to a node of the upgradeable set of isofunctional smart nodes that is not the parent node of the object that is to be modified;
   wherein said each node comprises at least one software layer for storing and managing the object, for maintaining a current status of the object and using a stored list of neighborhoods of the upgradeable set of isofunctional smart nodes to which the upgradeable set of isofunctional smart nodes is connected for informing each neighboring node of a possible change of status of the object.

2. The system for monitoring according to claim 1, wherein the set of functionalities includes data logging and formatting decentralized calculations.

3. The system for monitoring according to claim 1, wherein the data lake comprises synchronous or asynchronous nodes of communication with the distributed mesh network formed of smart nodes for allowing the data to be injected into the data lake.

4. The system for monitoring according to claim 1, wherein the central platform, managing the data lake, is composed of three parts or layers, each including at least one computer hardware architecture and at least one software layer, wherein execution of each of the at least one software layer on each computer hardware architecture of the at least one computer hardware architecture implementing, in each part or layer of the central platform, a functionality for managing problems, the problems addressed being, on one hand, different from one platform layer to another and, on another hand, associated with different people needing to interact with Big Data in an enterprise: business users, developers, and administrators/DevOps including moderators between the developers and the business users.

5. The system for monitoring according to claim 1, wherein the central platform generates a representation in the data lake of constitution and status of the distributed mesh network and of the industrial processes connected to the distributed mesh network and updates said representation at each change.

6. The system for monitoring according to claim 5, wherein each object belongs to at least one class which is a description of characteristics of one or more objects representative of an industrial process, each object being created from the at least one class and forming an instance of the at least one class in question, the characteristics and the status of the object being handled by methods incorporated in the upgradeable set of isofunctional smart nodes or the central platform, the status of an object corresponding to the information recorded at a given instant, as described by values of a set of properties comprising fields or attributes.

7. The system for monitoring according to claim 5, wherein the object is a representation of business or technical data defining a variables and/or services, the variables and/or services including:
   technical services consisting of protocol service layers for communicating with industrial equipment;
   primary variables which are variables storing data gathered by the technical services;
   calculation services which are for calculating indicators and implementing logic based on values of the primary variables;
   secondary variables which are for storing results of the values from the calculation services, wherein the secondary variables are therefore variables derived by calculation from the primary variables;
   miscellaneous services referred to as general services (e.g. archiving, printing, taking photos or videos, specific algorithm) for supplementing a system of control and data acquisition (SCADA) by business or media services.

8. The system for monitoring according to claim 5, wherein the object is handled without modifications made to the status of an object do not use the status of another object or influence this one, each object having a possible access permission for any use or any entity of the industrial processes, attributes or definition fields of the object and methods of handling the object being changed dynamically by a node manager.

9. The system for monitoring according to claim 5, wherein each object uses an attribute that defines a quality parameter representing a difference between a desired target value of the status of the object and an actual status or actual state of the desired target value, the desired target value of the status of the object being formalized by a request for modification of the status of said object, said request for modification being able to be formulated from any remote node even if it is not the parent node of the object, then transmitted to the distributed mesh network and from one node to another up to the parent node concerned, the execution of the request for modification by the parent node concerned thus allowing each of the upgradeable set of isofunctional smart nodes of the distributed mesh network to retrieve the actual status of the object and therefore to calculate a quality of the object.

10. The system for monitoring according to claim 1, wherein the data lake for measurement and process control is composed of a set of tools for storing and processing or recording data from the industrial processes.

11. The system for monitoring according to claim 1, wherein said set of functionalities comprises functionalities, implemented on a computer hardware architecture of the central platform, for creating and managing objects adapted to the industrial processes for controlling said industrial processes.

12. The system for monitoring according to claim 1, wherein each isofunctional smart node of the upgradeable set of isofunctional smart nodes comprises middleware allowing deployment of multiple nodes in the distributed mesh network by critical mass and neighborhood effect consisting in optimizing, by an algorithm executed on the computer hardware architecture, a number of smart nodes to be deployed and a number of interconnections of the smart nodes via neighborhoods for achieving availability, robustness of deployment and continuity of service required by a quality of service of a specific service.

13. The system for monitoring according to claim 1, wherein said set of functionalities comprises a functionality, implemented on a computer hardware architecture of said each node, for informing said each node in its neighborhood so that the at least one neighboring node informs other nodes following a path oriented in a direction that depends on a topology or specific architecture of the distributed mesh network, defining links between the upgradeable set of isofunctional smart nodes of the distributed mesh network, or if necessary following a path oriented toward the central platform, said each node thus informing a rest of the distributed mesh network and said each node thus storing the object, its current status and a parent node to which the object is assigned.

14. The system for monitoring according to claim 1, wherein the upgradeable set of isofunctional smart nodes comprise a given, finite memory capacity, said each node being used for a transfer of information or data directly to the data lake or the at least one neighboring node, the information or data not being retained in their cache memory.

15. The system for monitoring according to claim 1, wherein said each node comprises at least one interface for accessing its image of an object dictionary, this interface allowing a definition of a new node or a new object for a node, a request for modification being diffused in the distributed mesh network and transmitted from one node to another up to the parent node concerned if the modification made to the object dictionary does not relate to the node from which a node manager is accessed, the parent node of the object then proceeding to the execution of the request for modification, a result of the execution then being diffused in its turn in a rest of the distributed mesh network, said each node receiving this result updating its own image of the object dictionary.

\* \* \* \* \*